United States Patent
Shishido

(10) Patent No.: US 11,832,031 B2
(45) Date of Patent: Nov. 28, 2023

(54) PROJECTION SYSTEM CONTROLLING METHOD, AND PROJECTOR

(71) Applicant: SEIKO EPSON CORPORATION, Tokyo (JP)

(72) Inventor: Yoichi Shishido, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/741,584

(22) Filed: May 11, 2022

(65) Prior Publication Data

US 2022/0368872 A1   Nov. 17, 2022

(30) Foreign Application Priority Data

May 12, 2021 (JP) ................................ 2021-081094

(51) Int. Cl.
H04N 9/31 (2006.01)

(52) U.S. Cl.
CPC ......... *H04N 9/3194* (2013.01); *H04N 9/3147* (2013.01); *H04N 9/3185* (2013.01)

(58) Field of Classification Search
CPC .... H04N 9/3147; H04N 9/3194; H04N 9/317; H04N 9/3185; H04N 9/3179; H04N 9/3141; G03B 35/20; G03B 21/14; G03B 21/147; G06T 5/006; G06T 3/00; G06T 7/30–49; G06T 7/60; G06T 7/62; G06T 7/70–77; G09G 2320/02; G09G 2320/0693; G09G 2320/06
See application file for complete search history.

(56) References Cited

U.S. PATENT DOCUMENTS 6,219,099 B1 * 4/2001 Johnson ............... H04N 9/12
                                                    348/E17.005
2005/0099405 A1   5/2005 Dietz et al.
(Continued)

FOREIGN PATENT DOCUMENTS

JP    2005-252676 A    9/2005
JP    2005-252804 A    9/2005
(Continued)

*Primary Examiner* — John W Miller
*Assistant Examiner* — Humam M Satti
(74) *Attorney, Agent, or Firm* — Oliff PLC

(57) ABSTRACT

A projection system controlling method includes identifying a first correspondence, identifying a second correspondence, identifying a third correspondence between a plurality of pixels corresponding to an overlap region in an image projected by a first projector, accuracy of the third correspondence is higher than accuracy of the first correspondence, identifying a fourth correspondence between a plurality of pixels corresponding to the overlap region in an image projected by a second projector, accuracy of the fourth correspondence is higher than accuracy of the second correspondence, projecting an image onto a region different from the overlap region based on the first correspondence, projecting an image onto the overlap region based on the third correspondence, projecting an image onto a region different from the overlap region based on the second correspondence, and projecting an image onto the overlap region based on the fourth correspondence.

10 Claims, 10 Drawing Sheets

(56) References Cited

U.S. PATENT DOCUMENTS

| | | | |
|---|---|---|---|
| 2005/0185285 A1* | 8/2005 | Miyasaka | G02B 7/09 |
| | | | 359/676 |
| 2016/0162246 A1 | 6/2016 | Ouchi | |
| 2017/0180689 A1* | 6/2017 | Morrison | H04N 9/3194 |
| 2018/0013995 A1* | 1/2018 | Mizushiro | H04N 9/3182 |
| 2019/0035109 A1 | 1/2019 | Kaji | |
| 2019/0219903 A1 | 7/2019 | Agustin | |

FOREIGN PATENT DOCUMENTS

| | | |
|---|---|---|
| JP | 2007-510966 A | 4/2007 |
| JP | 2016-109813 A | 6/2016 |
| JP | 2018-005018 A | 1/2018 |
| JP | 2018-152660 A | 9/2018 |
| JP | 2019-125943 A | 7/2019 |
| WO | 2017/169723 A1 | 10/2017 |

* cited by examiner

FIG. 2
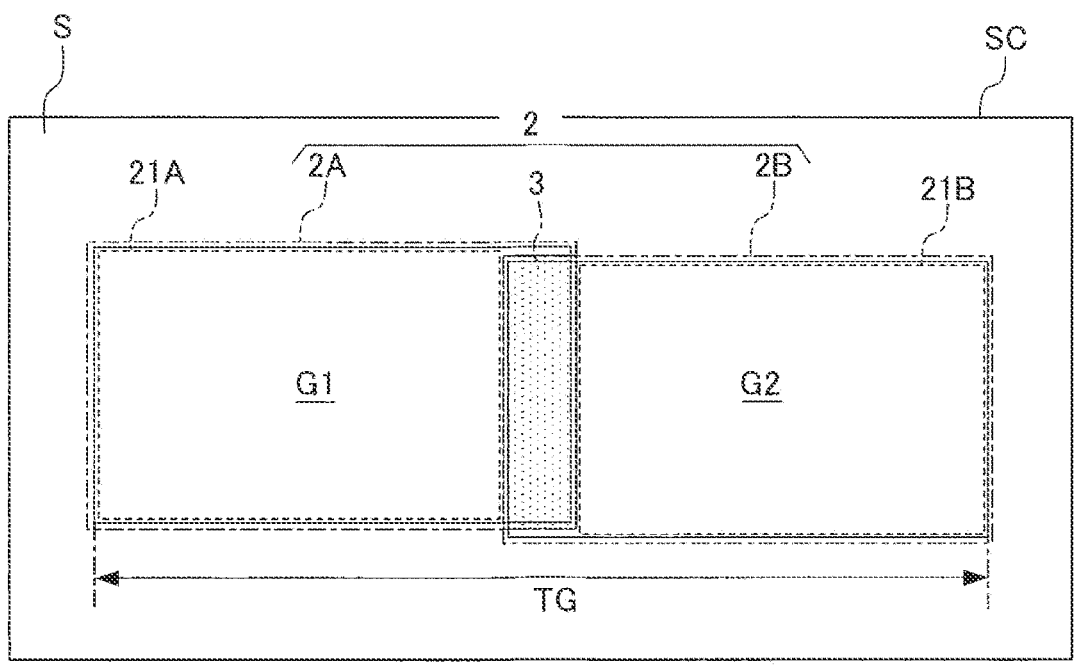
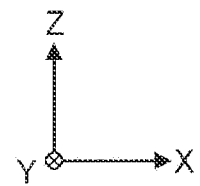

PROJECTION SYSTEM CONTROLLING METHOD, AND PROJECTOR

The present application is based on, and claims priority from JP Application Serial Number 2021-081094, filed May 12, 2021, the disclosure of which is hereby incorporated by reference herein in its entirety.

BACKGROUND

1. Technical Field

The present disclosure relates to a projection system controlling method, and a projector.

2. Related Art

There is a known multi-projection system of related art including a plurality of projectors. In the multi-projection system, a tiled image formed of images projected from the plurality of projectors is displayed on a screen. On the screen, in an overlap region where the region where the image projected from one of the plurality of projectors is displayed and the region where the image projected from another projector is displayed overlap with each other, the image projected from the one projector and the image projected from the other projector overlap with each other.

In the multi-projection system, the images displayed on the screen are each distorted due to the performance of the projection lens of the projector and the angle between the optical axis of the projector and the screen. The plurality of projectors each therefore perform calibration for correction of the distortion. The calibration includes acquisition of the correspondence between the coordinate system of a projection apparatus incorporated in the projector and the coordinate system of an imaging apparatus incorporated in the projector. The execution of the calibration allows each of the plurality of projectors to correct an input image based on the correspondence and project a corrected image on the screen. For example, in JP-A-2018-152660, a single calibration image showing a plurality of grid points is used in the calibration. On the other hand, in JP-A-2007-510966, a plurality of Gray code images different from one another are used as the calibration image, and the plurality of Gray code images are displayed on the screen in a time division manner.

Since the images projected from the plurality of projectors overlap with each other in the overlap regions of the tiled image, it is necessary to improve the accuracy of the correction of the input images. When a plurality of Gray code images are employed in the calibration performed by each of the projectors, it takes a long time for the calibration as compared with a case where the calibration is performed by using a single calibration image.

The present disclosure has been made in view of the circumstances described above, and an advantage of the present disclosure is reduction in the time required for the calibration with an increase in the accuracy of the calibration in the overlap region.

SUMMARY

To achieve the advantage described above, a projection system controlling method according to an aspect of the present disclosure is a method for controlling a projection system which includes a first projector including a first imaging apparatus and a second projector including a second imaging apparatus and in which an image projected from the first projector and an image projected from the second projector overlap with each other in an overlap region of a display surface. The method includes identifying a first correspondence between a plurality of pixels that form an image projected from the first projector onto a first projection region of the display surface and a plurality of pixels that form a first captured image produced by the first imaging apparatus through capture of an image of the display surface, identifying a second correspondence between a plurality of pixels that form an image projected from the second projector onto a second projection region of the display surface and a plurality of pixels that form a second captured image produced by the second imaging apparatus through capture of an image of the display surface, identifying a third correspondence between a plurality of pixels corresponding to the overlap region in the image projected by the first projector and a plurality of pixels corresponding to the overlap region in the first captured image, identifying a fourth correspondence between a plurality of pixels corresponding to the overlap region in the image projected by the second projector and a plurality of pixels corresponding to the overlap region in the second captured image, projecting an image onto a region of the first projection region, the region being different from the overlap region, based on the first correspondence, projecting an image onto the overlap region based on the third correspondence, projecting an image onto a region of the second projection region, the region being different from the overlap region, based on the second correspondence, and projecting an image onto the overlap region based on the fourth correspondence, and accuracy of the third correspondence is higher than accuracy of the first correspondence, and accuracy of the fourth correspondence is higher than accuracy of the second correspondence.

To achieve the advantage described above, a projection system controlling method according to another aspect of the present disclosure is a method for controlling a projection system which includes a first projector, a second projector, and an imaging apparatus and in which an image projected from the first projector and an image projected from the second projector overlap with each other in an overlap region of a display surface. The method includes identifying a first correspondence between a plurality of pixels that form an image projected from the first projector onto a first projection region of the display surface and a plurality of pixels that form a captured image produced by the imaging apparatus through capture of an image of the display surface on which the image is projected, identifying a second correspondence between a plurality of pixels that form an image projected from the second projector onto a second projection region of the display surface and a plurality of pixels that form a captured image produced by the imaging apparatus through capture of an image of the display surface on which the image is projected, identifying a third correspondence between a plurality of pixels corresponding to the overlap region in the image projected by the first projector and a plurality of pixels corresponding to the overlap region in the captured image captured by the imaging apparatus, identifying a fourth correspondence between a plurality of pixels corresponding to the overlap region in the image projected by the second projector and a plurality of pixels corresponding to the overlap region in the captured image captured by the imaging apparatus, projecting an image onto a region of the first projection region, the region being different from the overlap region, based on the first correspondence, projecting an image onto the overlap region based on the third correspondence, projecting an image onto a region of the second projection region, the region being different from the overlap region, based on the second correspondence, and projecting an image onto the overlap region based on the fourth correspondence, and accuracy of the third correspondence is higher than accuracy of the first correspondence, and accuracy of the fourth correspondence is higher than accuracy of the second correspondence.

To achieve the advantage described above, a projection system according to an aspect of the present disclosure is a projection system which includes a first projector including a first imaging apparatus and a second projector including a second imaging apparatus and in which an image projected from the first projector and an image projected from the second projector overlap with each other in an overlap region of a display surface. The first projector identifies a first correspondence between a plurality of pixels that form an image projected from the first projector onto a first projection region of the display surface and a plurality of pixels that form a first captured image produced by the first imaging apparatus through capture of an image of the display surface, identifies a third correspondence between a plurality of pixels corresponding to the overlap region in the image projected by the first projector and a plurality of pixels corresponding to the overlap region in the first captured image, and projects an image onto a region of the first projection region, the region being different from the overlap region, based on the first correspondence and projects an image onto the overlap region based on the third correspondence. The second projector identifies a second correspondence between a plurality of pixels that form an image projected from the second projector onto a second projection region of the display surface and a plurality of pixels that form a second captured image produced by the second imaging apparatus through capture of an image of the display surface, identifies a fourth correspondence between a plurality of pixels corresponding to the overlap region in the image projected by the second projector and a plurality of pixels corresponding to the overlap region in the second captured image, and projects an image onto a region of the second projection region, the region being different from the overlap region, based on the second correspondence and projects an image onto the overlap region based on the fourth correspondence. Accuracy of the third correspondence is higher than accuracy of the first correspondence, and accuracy of the fourth correspondence is higher than accuracy of the second correspondence.

To achieve the advantage described above, a projection system according to another aspect of the present disclosure is a projection system which includes a first projector, a second projector, and an imaging apparatus and in which an image projected from the first projector and an image projected from the second projector overlap with each other in an overlap region of a display surface. The first projector identifies a first correspondence between a plurality of pixels that form an image projected from the first projector onto a first projection region of the display surface and a plurality of pixels that form a first captured image produced by the imaging apparatus through capture of an image of the display surface, identifies a third correspondence between a plurality of pixels corresponding to the overlap region in the image projected by the first projector and a plurality of pixels corresponding to the overlap region in the first captured image, and projects an image onto a region of the first projection region, the region being different from the overlap region, based on the first correspondence and projects an image onto the overlap region based on the third correspondence. The second projector identifies a second correspondence between a plurality of pixels that form an image projected from the second projector onto a second projection region of the display surface and a plurality of pixels that form a second captured image produced by the imaging apparatus through capture of an image of the display surface, identifying a fourth correspondence between a plurality of pixels corresponding to the overlap region in the image projected by the second projector and a plurality of pixels corresponding to the overlap region in the second captured image, and projects an image onto a region of the second projection region, the region being different from the overlap region, based on the second correspondence and projects an image onto the overlap region based on the fourth correspondence. Accuracy of the third correspondence is higher than accuracy of the first correspondence, and accuracy of the fourth correspondence is higher than accuracy of the second correspondence.

To achieve the advantage described above, a projector according to an aspect of the present disclosure is a projector including an imaging apparatus, a projection apparatus, and a processing apparatus. The processing apparatus identifies a first relationship that is a correspondence between a plurality of pixels that form an image projected from the projection apparatus onto a projection region of a display surface and a plurality of pixels that form a captured image produced by the imaging apparatus through capture of an image of the display surface, and identifies a second relationship that is a correspondence between a plurality of pixels corresponding to an overlap region of an image projected by the projection apparatus, the overlap region being a region where the image projected by the projection apparatus and an image projected from a projector different from the projector overlap with each other, and a plurality of pixels corresponding to the overlap region in the captured image. The projection apparatus projects an image onto a region of the projection region, the region being different from the overlap region, based on the first relationship and projects an image onto the overlap region based on the second relationship. Accuracy of the second relationship is higher than accuracy of the first relationship.

BRIEF DESCRIPTION OF THE DRAWINGS

FIG. 2 shows a screen on which a tiled image is displayed.

DESCRIPTION OF EXEMPLARY EMBODIMENTS

1. Embodiment

Figure 1:
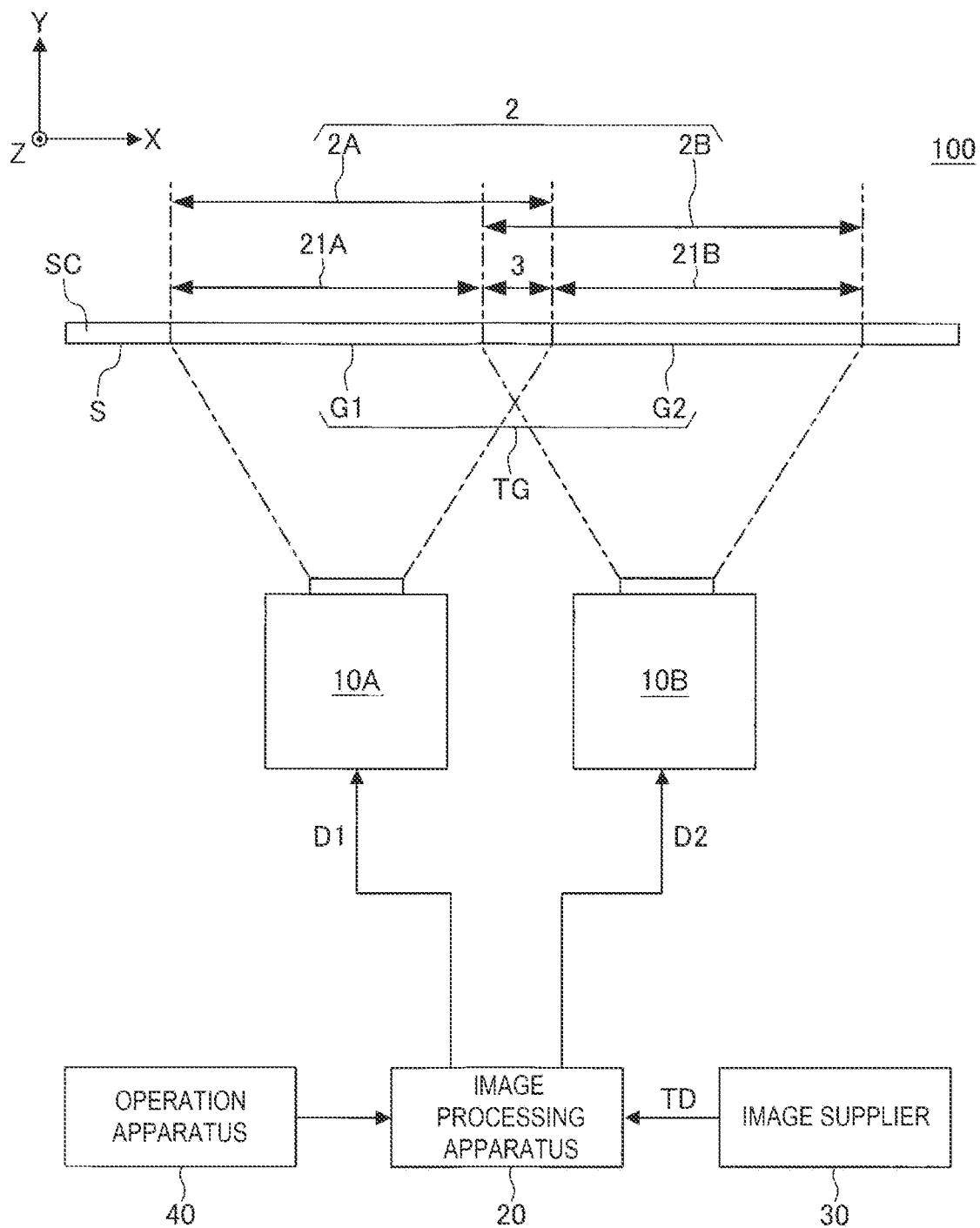
FIG. 1 shows an example of the configuration of a projection system according to an embodiment.

A preferable embodiment of the present disclosure will be described below with reference to the drawings. In the drawings, the dimensions and scale of each portion differ from the actual values as appropriate. The drawings are diagrammatically drawn in some cases so as to be easily understood. Furthermore, the scope of the present disclosure is not limited to the forms presented below by way of example unless otherwise stated to specifically limit the present disclosure.

FIG. 1 shows an example of the configuration of a projection system 100 according to the present embodiment. The projection system 100 includes a projector 10A and a projector 10B. The present embodiment will be described with reference to the case where the two projectors 10A and 10B are provided by way of example. In the following description, when it is not particularly necessary to distinguish the projector 10A and the projector 10B from each other, they are called the projectors 10. The projector 10A is an example of a "first projector", and the projector 10B is an example of a "second projector".

The projection system 100 includes an image processing apparatus 20, an image supplier 30, an operation apparatus 40, and a screen SC, as shown in FIG. 1. The projector 10A, the projector 10B, and the image processing apparatus 20 are communicably connected to each other. The connection among the projector 10A, the projector 10B, and the image processing apparatus 20 may be wireless or wired connection, or connection with a network, such as the Internet or a LAN (local area network), interposed among them. In the present embodiment, the projector 10A functions as a master projector, and the projector 10B functions as a slave projector.

It is assumed in FIG. 1 to use axes X, Y, and Z perpendicular to one another. The direction along the axis X viewed from an arbitrary point is referred to as an axis-X direction. Similarly, the direction along the axis Y viewed from an arbitrary point is referred to as an axis-Y direction, and the direction along the axis Z viewed from an arbitrary point is referred to as an axis-Z direction. A plane X-Y including the axes X and Y corresponds to a horizontal plane. The axis Z is an axial line along the vertical direction. In the present embodiment, the screen SC is disposed so as to stand vertically. The projection system 100 can instead be so configured that the screen SC is disposed so as to be parallel to the horizontal plane, and that the projector 10 is disposed above the screen SC in the vertical direction.

The projectors 10A and 10B project images G1 and G2 on the screen SC, respectively. The images G1 and G2 projected on the screen SC form a tiled image TG. The front surface of the screen SC functions as a display surface S, where the tiled image TG is displayed. In the following description, when it is not necessary to distinguish the images G1 and G2 from each other, they are referred to as images G.

The display surface S has a first projection region 2A and a second projection region 2B. The first projection region 2A and the second projection region 2B form a projection region 2 of the display surface S. The first projection region 2A corresponds to the projector 10A and is a region where the image G1 is displayed. The second projection region 2B corresponds to the projector 10B and is a region where the image G2 is displayed. The first projection region 2A and the second projection region 2B overlap with each other at the display surface S to form an overlap region 3. The first projection region 2A is formed of the overlap region 3 and a non-overlap region 21A. The non-overlap region 21A is a region as a result of removal of the overlap region 3 from the first projection region 2A. The second projection region 2B is formed of the overlap region 3 and a non-overlap region 21B. The non-overlap region 21B is a region as a result of removal of the overlap region 3 from the second projection region 2B.

The image processing apparatus 20 is coupled to each of the projector 10A and the projector 10B, as shown in FIG. 1. The image processing apparatus 20 divides image data TD acquired from the image supplier 30, which will be described later, to generate input image data D1 and the input image data D2. The image processing apparatus 20 outputs the input image data D1 to the projector 10A and outputs the input image data D2 to the projector 10B. In the present embodiment, the projector 10A projects the image G1 onto the first projection region 2A based on the input image data D1, and the projector 10B projects the image G2 onto the second projection region 2B based on the input image data D2, so that the tiled image TG is displayed on the display surface S. In the following description, when it is not necessary to distinguish the input image data D1 and the input image data D2 from each other, they are referred to as input image data D.

FIG. 2 shows an example of the configuration of the tiled image TG, with the screen SC, on which the tiled image TG is displayed, viewed in the axis-Y direction. In FIG. 2, the displayed images G1 and G2 are shifted from each other in the axis-Z direction for convenience of description, but the images G1 and G2 are actually aligned with each other at the same height position. Furthermore, the first projection region 2A is larger than the image G1, but the first projection region 2A and the image G1 actually have the same size, and the circumferential edge of the first projection region 2A coincides with the circumferential edge of the image G1. Similarly, the second projection region 2B is larger than the image G2, but the second projection region 2B and the image G2 actually have the same size, and the circumferential edge of the second projection region 2B coincides with the circumferential edge of the image G2.

The tiled image TG is formed of the images G1 and G2 arranged side by side in the axis-X direction. In the present embodiment, the projector 10 are disposed in the plane X-Y, and the images G1 and G2 arranged in the axis-X direction form the tiled image TG. The tiled image TG in the present embodiment, however, does not necessarily have the configuration shown in FIG. 2 and may be formed of images projected from the projectors 10 stacked in the axis-Z direction.

The image processing apparatus 20 is an information processing apparatus, such as a PC (personal computer), a smartphone, or a tablet terminal each including a processor that is not shown. The image processing apparatus 20 is coupled to the image supplier 30, as shown in FIG. 1. The image supplier 30 supplies the image processing apparatus 20 with the image data TD corresponding to the tiled image TG. The image data TD may be data based on still images or may be data based on motion images. The image supplier 30 is realized by a medium reproduction apparatus, such as a video reproduction apparatus or a DVD (digital versatile disc) apparatus, or an information processing apparatus, such as a PC, a smartphone, and a tablet terminal. The image processing apparatus 20 may have part or entirety of the functions of the image supplier 30.

The image processing apparatus 20 is coupled to the operation apparatus 40, as shown in FIG. 1. The operation apparatus 40 accepts an operator's input relating to the setting of a display mode of the tiled image TG. The operation apparatus 40 instead accepts the operator's input relating to the setting of the size of the tiled image TG and the resolution thereof. The operation apparatus 40 further accepts the operator's input relating to the setting of the size of the overlap region 3 and the position of the overlap region 3 on the display surface S. The operation apparatus 40 may be integrated with the image processing apparatus 20.

Figure 3:
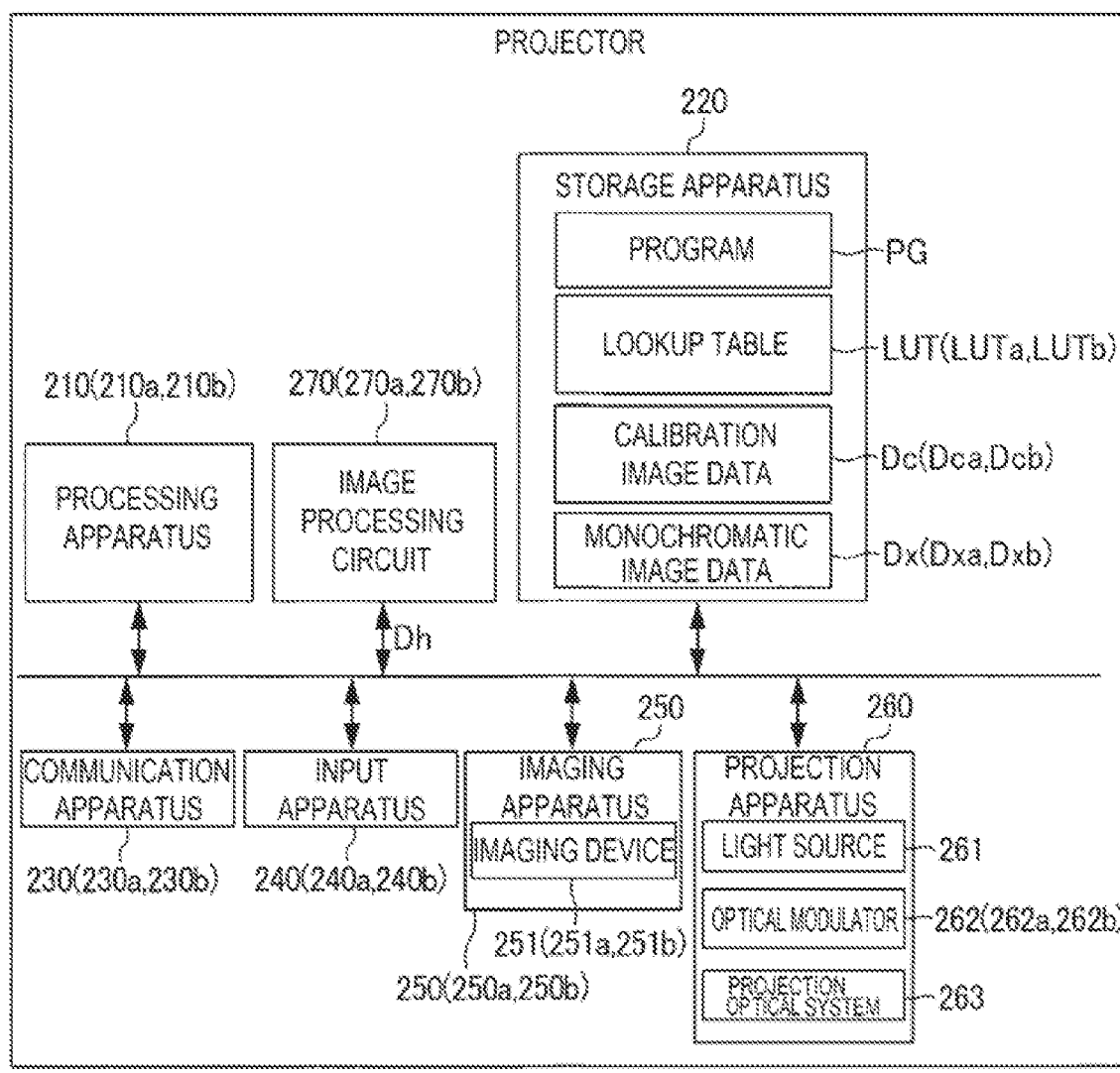
FIG. 3 shows an example of the configuration of a projector.

FIG. 3 shows an example of the configuration of each of the projectors 10. The projectors 10 each include a processing apparatus 210, a storage apparatus 220, a communication apparatus 230, an input apparatus 240, an imaging apparatus 250, a projection apparatus 260, and an image processing circuit 270, as shown in FIG. 3.

The processing apparatus 210 is an apparatus that controls each portion of the projector 10. The processing apparatus 210 includes a processor, such as a CPU (central processing unit). The processing apparatus 210 may be formed of a single processor or a plurality of processors. Part or entirety of the functions of the processing apparatus 210 may be realized by hardware, such as a DSP (digital signal processor), an ASIC (application specific integrated circuit), a PLD (programmable logic device), and an FPGA (field programmable gate array).

The storage apparatus 220 stores a program PG executed by the processing apparatus 210, and a lookup table LUT, calibration image data Dc, and monochromatic image data Dx used by the processing apparatus 210. The calibration image data Dc represents a calibration image having a plurality of grid points. The monochromatic image data Dx represents a monochromatic image. The lookup table LUT will be described later in detail. The storage apparatus 220 includes, for example, a hard disk drive or a semiconductor memory. Part or entirety of the storage apparatus 220 may be provided in a storage apparatus or any other component external to the projector 10.

The communication apparatus 230 is a communication circuit communicably coupled to the image processing apparatus 20. The communication apparatus 230 includes an interface, for example, a USB (universal serial bus) and a LAN. The communication apparatus 230 acquires the input image data D outputted from the image processing apparatus 20. The input image data D represents input images. The communication apparatus 230 may be wirelessly connected to the image processing apparatus 20, for example, in accordance with Wi-Fi or Bluetooth, or may be connected to the image processing apparatus 20 via, for example, a LAN or the Internet. Wi-Fi and Bluetooth are each a registered trademark.

The input apparatus 240 is, for example, an operation panel including a variety of switches and provided as part of an enclosure, which is not shown, of the projector 10. Specifically, the input apparatus 240 is formed, for example, of a power switch that powers on and off the projector 10, a switch that causes the projector 10 to start projecting an image, and a switch that invokes a menu via which the projector 10 is set.

The imaging apparatus 250 generates captured image data representing a captured image by capturing an image of the display surface S of the screen SC. The imaging apparatus 250 includes an imaging device 251, as shown in FIG. 3. The imaging apparatus 250 is, for example, a camera.

The imaging device 251 is, for example, an image sensor such as a CCD (charge coupled device) or a CMOS (complementary MOS). The imaging device 251 captures an image of the display surface S and outputs captured image data to the processing apparatus 210.

The projection apparatus 260 projects the image G onto the display surface S of the screen SC. The projection apparatus 260 includes a light source 261, an optical modulator 262, and a projection optical system 263, as shown in FIG. 3.

The light source 261 is formed, for example, of a halogen lamp, a xenon lamp, an ultrahigh-pressure mercury lamp, an LED (light emitting diode), or a laser light source. The optical modulator 262 modulates the light emitted by the light source 261 to generate image light. The optical modulator 262 includes, for example, three transmissive or reflective liquid crystal panels corresponding to the three primary colors of light of R, G, and B light. The optical modulator 262 may instead be configured to include a light modulation device, such as a digital mirror device, and a color wheel. The projection optical system 263 guides the image light modulated by the optical modulator 262 to the screen SC and brings the image light into focus on the display surface S. The projection optical system 263 may further include a zoom mechanism that enlarges or reduces the image G to be displayed on the display surface S of the screen SC and a focus adjustment mechanism that performs focus adjustment.

The image processing circuit 270 performs predetermined image processing on the input image data D acquired by the communication apparatus 230. Examples of the image processing performed by the image processing circuit 270 include not only keystone correction but also digital zooming, color tone correction, and luminance correction.

The image G projected from each of the projectors 10 and displayed on the display surface S is distorted in accordance with the angle between the optical axis of the projector 10 and the display surface S. The keystone correction corrects trapezoidal distortion produced on the display surface S when the image G is projected from the projector 10. The keystone correction corrects the input image based on the correspondence between a camera coordinate system and a projector coordinate system. The camera coordinate system is a coordinate system of a captured image captured by the imaging apparatus 250. The projector coordinate system is a coordinate system of the image G projected from the projector 10. The correspondence between the camera coordinate system and the projector coordinate system represents the correspondence between certain coordinates in the captured image and the corresponding coordinates in the image G. In other words, the correspondence between the camera coordinate system and the projector coordinate system is the correspondence between a plurality of pixels that form the captured image and a plurality of pixels that form the image G. The lookup table LUT stores the correspondence between the plurality of pixels that form the captured image and the plurality of pixels that form the image G.

The image processing circuit 270 refers to the lookup table LUT and performs the keystone correction on the input image data D to generate corrected image data Dh. The image processing circuit 270 outputs the corrected image data Dh to the optical modulator 262, so that the image G based on the corrected image data Dh is displayed on the screen SC.

The processing apparatus 210 reads the program PG from the storage apparatus 220 and executes the read program PG to control the entire projector 10. The processing apparatus 210 performs first calibration and second calibration before projecting the image G based on the input image data Don the display surface S. The two-step calibration identifies the correspondence between the plurality of pixels that form the captured image and the plurality of pixels that form the image G.

Figure 4:
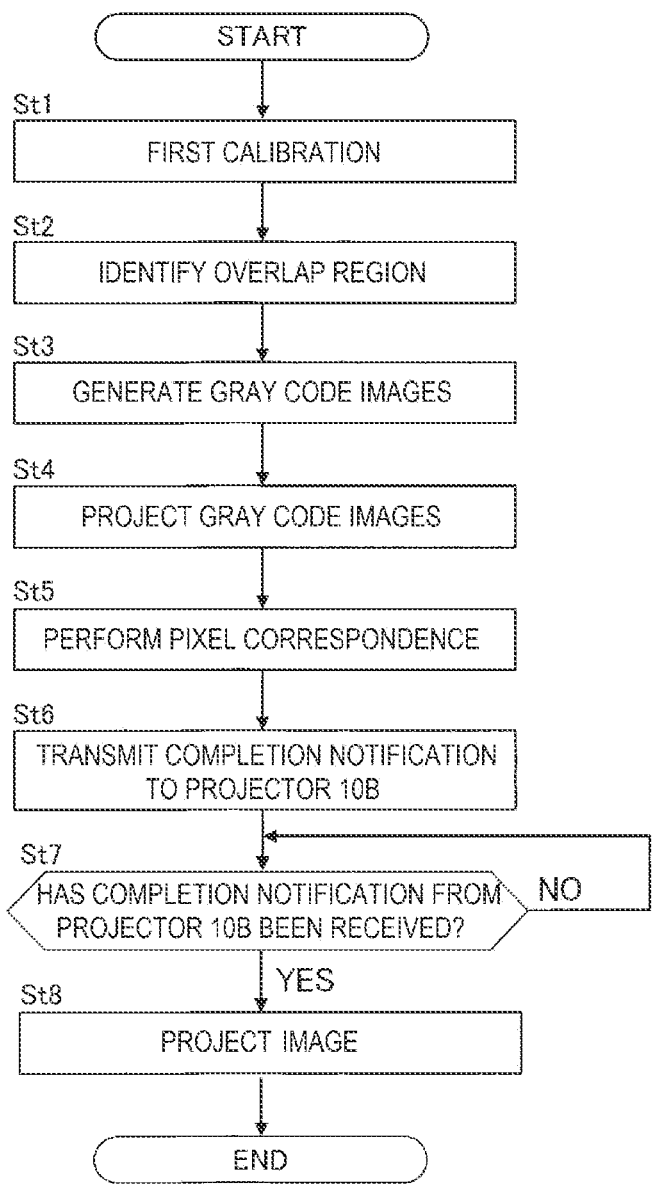
FIG. 4 is a flowchart showing an example of the action of the projector.

FIG. 4 is a flowchart showing an example of the action of the projector 10A. The action of the projector 10A will be described below with reference to FIG. 4 as appropriate. In the following description, a subscript a is added to an element relating to the projector 10A, and a subscript b is added to an element relating to the projector 10B.

Figure 5:
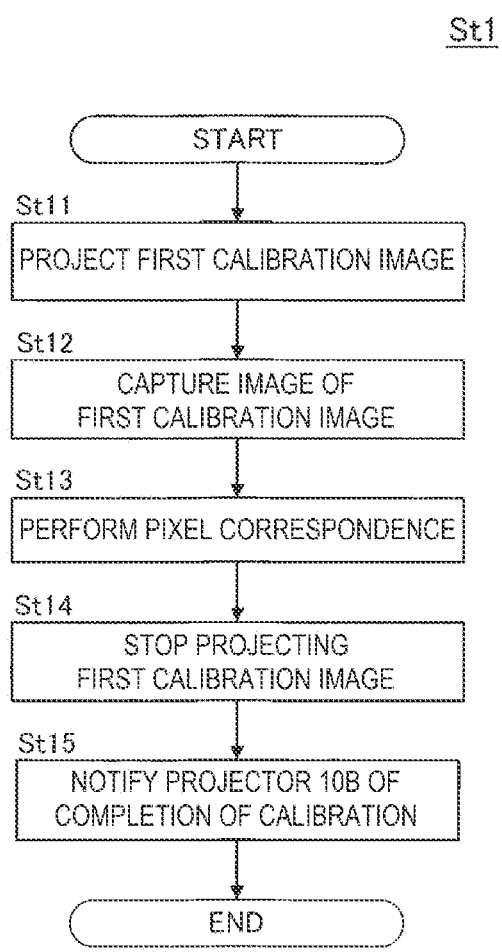
FIG. 5 is a flowchart showing an example of calibration performed by the projector.

A processing apparatus 210a first performs the first calibration in step St1. FIG. 5 is a flowchart showing the first calibration in detail. Step St1 will be described in detail with reference to FIG. 5 as appropriate.

Figure 6:
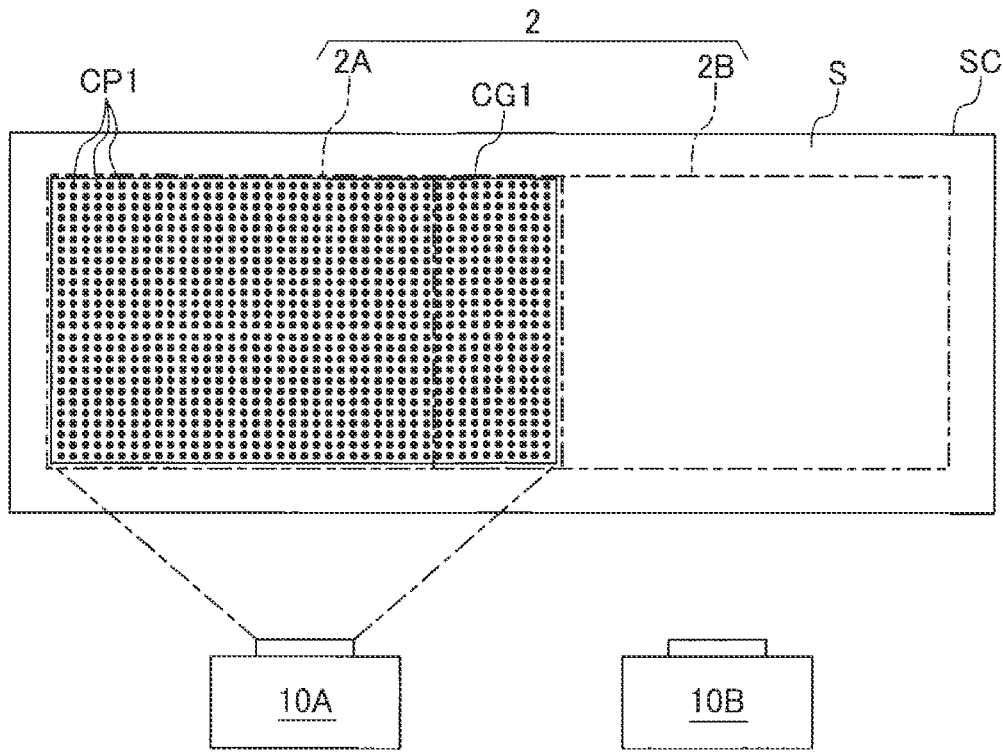
FIG. 6 diagrammatically shows the projector that performs a calibration mode.

When the processing apparatus 210a accepts an instruction of start of the calibration, the processing apparatus 210a reads in step St11 calibration image data Dca from a storage apparatus 220a and outputs the read data to a projection apparatus 260a. The projection apparatus 260a projects a first calibration image CG1 indicated by the calibration image data Dca on the display surface S. The first calibration image CG1 is thus displayed on the display surface S, as shown in FIG. 6. The first calibration image CG1 according to the present embodiment is a dot pattern image containing a plurality of first markers CP1, as shown in FIG. 6. The plurality of first markers CP1 are regularly arranged in a grid pattern. Examples of the aforementioned instruction of start of the calibration may include an instruction issued when an input apparatus 240a is operated and an instruction based on a control program.

An imaging apparatus 250a then captures an image of the display surface S on which the first calibration image CG1 is projected in step St12 under the control of the processing apparatus 210a. The imaging apparatus 250a is an example of a "first imaging apparatus". The dot pattern contained in the captured image that is a captured display surface S on which the first calibration image CG1 is projected is distorted in accordance with the position where the imaging apparatus 250a is installed. The processing apparatus 210a processes each of the first markers CP1 in the captured image to identify the coordinates of the first marker CP1 in the camera coordinate system. Since the first markers CP1 each have an area, the processing apparatus 210a calculates the center of gravity of each of the first markers CP1 in the captured image, and uses the result of the calculation as the coordinates of the first marker CP1 in the camera coordinate system. The coordinates in the camera coordinate system are expressed by the position of each of the pixels that form an imaging device 251a. On the other hand, the first markers CP1 in the first calibration image CG1 each have known coordinates in the projector coordinate system. The coordinates of each of the first markers CP1 mean the coordinates of the center of gravity of the first marker CP1. The plurality of pixels that form the first calibration image CG1 correspond to the pixels of each of the liquid crystal panels of the optical modulator 262a. The coordinates in the projector coordinate system are therefore indicated by the positions of the pixels that form the liquid crystal panel.

In step St13, the processing device 210a subsequently causes the plurality of pixels that form the captured image to correspond to the plurality of pixels that form the image G1 based on the coordinates of the first markers CP1 in the captured image and the coordinates of the first markers CP1 in the first calibration image CG1. Since the first markers CP1 are regularly arranged in the first calibration image CG1, the correspondence between the plurality of pixels that form the first calibration image CG1 and the plurality of pixels that form the captured image cannot be instantly identified. The processing apparatus 210a therefore causes the plurality of pixels that form the captured image to correspond to the plurality of pixels that form the image G1 by performing interpolation. The processing apparatus 210a thus identifies a first correspondence between the plurality of pixels that form the image G1 projected from the projector 10A onto the display surface S and the plurality of pixels that form the captured image created by the imaging apparatus 250a through capture of an image of the display surface S on which the image G1 is projected. The processing apparatus 210a stores the first correspondence in a lookup table LUTa. The captured image is an example of a "first captured image", and the first correspondence is an example of a "first relationship".

The processing apparatus 210a subsequently causes in step St14 the projection apparatus 260a to stop projecting the first calibration image CG1. In step St15, the processing apparatus 210a notifies a processing apparatus 210b that the preceding step St13 has been completed. Upon acquisition of the notification, the processing apparatus 210b performs the same first calibration performed in the preceding steps St11 to St13, as the processing apparatus 210a does.

Figure 7:
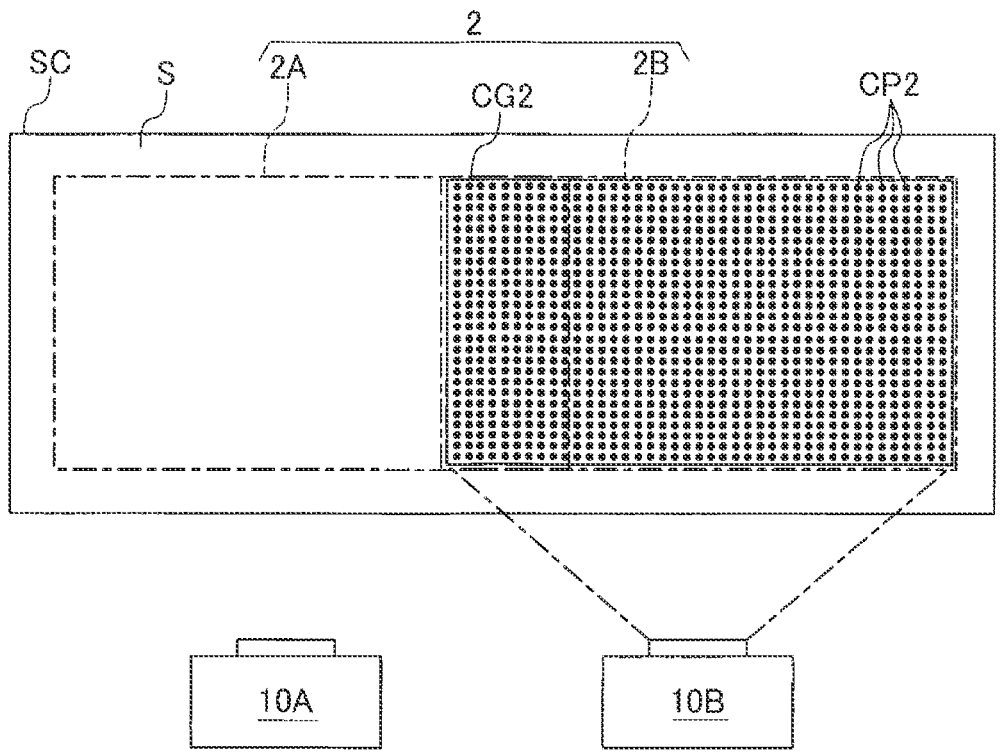
FIG. 7 diagrammatically shows the projector that performs the calibration mode.

FIG. 7 shows a second calibration image CG2 projected on the display surface S. In step St11, a projection apparatus 260b projects the second calibration image CG2 onto the display surface S, as the projection device 260a does. The second calibration image CG2 is thus displayed on the display surface S, as shown in FIG. 7. The second calibration image CG2 according to the present embodiment is a dot pattern image containing a plurality of second markers CP2, as shown in FIG. 7. The plurality of second markers CP2 are regularly arranged in a grid pattern.

An imaging apparatus 250b captures an image of the display surface S on which the second calibration image CG2 is projected in step St12. The imaging apparatus 250b is an example of a "second imaging apparatus".

The processing apparatus 210b thus identifies in step St13 a second correspondence between the plurality of pixels that form the image G2 projected from the projector 10B onto the second projection region 2B and the plurality of pixels that form the captured image created by the imaging apparatus 250b through capture of an image of the display surface S on which the image G2 is projected. The processing apparatus 210b stores the second correspondence in a lookup table LUTb.

Returning to FIG. 4, the processing apparatus 210a then identifies the overlap region 3 in step St2. Specifically, the processing apparatus 210a reads monochromatic image data Dxa from the storage apparatus 220a and outputs the monochromatic image data Dxa to the projection apparatus 260a. The monochromatic image data Dxa represents a monochromatic image as described above. The projection apparatus 260a projects the monochromatic image onto the first projection region 2A in accordance with the data. The monochromatic image is an example of a "first projection image".

The processing apparatus 210a transmits a projection request that instructs the projector 10B to project a monochromatic image. Upon receipt of the projection request, the processing apparatus 210b of the projector 10B reads monochromatic image data Dxb from the storage apparatus 220b and outputs the monochromatic image data Dxb to the projection apparatus 260b. The projection apparatus 260b projects the monochromatic image onto the second projection region 2B in accordance with the data. The monochromatic image is an example of a "second projection image".

The monochromatic image projected from the projection apparatus 260a and the monochromatic image projected from the projection apparatus 260b overlap with each other on the display surface S. Now, the monochromatic image projected from the projection apparatus 260a overlaps with the monochromatic image projected from the projection apparatus 260b on the display surface S. Therefore, out of the monochromatic image projected from the projection apparatus 260a, the region that overlaps with the monochromatic image projected from the projection apparatus 260b is brighter than the region different from the overlap region. Similarly, the monochromatic image projected from the projection apparatus 260b overlaps with the monochromatic image projected from the projection apparatus 260a on the display surface S. Therefore, out of the monochromatic image projected from the projection apparatus 260b, the region that overlaps with the monochromatic image projected from the projection apparatus 260a is brighter than the region different from the overlap region. The monochromatic images projected from the projection apparatuses 260a and 260b are each typically a white image, but not necessarily, and may instead be a monochromatic image having a color different from white.

The imaging apparatus 250a subsequently captures an image of the first projection region 2A that displays the monochromatic image and outputs captured image data representing the captured image under the control of the processing apparatus 210a. The processing apparatus 210a then compares the luminance of each of the plurality of pixels that form the captured image with a threshold based on the captured image data. Based on the result of the comparison, the processing apparatus 210a identifies a region containing pixels having luminance greater than or equal to the threshold as the overlap region 3. The threshold is set so as to allow determination of the overlap region 3. Specifically, let R be the threshold, X be the luminance of the monochromatic image projected from the projection apparatus 260a, and Y be the luminance of the monochromatic image projected from the projection apparatus 260b, and the threshold R may satisfy X<R<X+Y. It is preferable that R=(2 X+Y)/2 in consideration of a margin.

Carrying out the processes described above allows identification of the overlap region 3 in the camera coordinate system. The processing apparatus 210a identifies the overlap region 3 in the projector coordinate system based on the first correspondence generated by the first calibration in the preceding step St1.

The processing apparatus 210a then transmits an imaging request that instructs the projector 10B to capture an image of the second projection region 2B that displays the monochromatic image. The processing apparatus 210b of the projector 10B having received the imaging request produces a captured image by causing the imaging apparatus 250b to capture an image of the second projection region 2B that displays the monochromatic image. The processing apparatus 210b compares the luminance of each of the plurality of pixels that form the captured image with a threshold based on the captured image data representing the captured image. Based on the result of the comparison, the processing apparatus 210b identifies a region containing pixels having luminance greater than or equal to the threshold as the overlap region 3. The threshold is set so as to allow determination of the overlap region 3. Specifically, let r be the threshold, x be the luminance of the monochromatic image projected from the projection apparatus 260b, and y be the luminance of the monochromatic image projected from the projection apparatus 260a, and the threshold r may satisfy x<r<x+y. It is preferable that r=(2 x+y)/2 in consideration of a margin.

Carrying out the processes described above allows identification of the overlap region 3 in the camera coordinate system. The processing apparatus 210b identifies the overlap region 3 in the projector coordinate system based on the first correspondence generated by the first calibration in the preceding step St1.

The processing apparatus 210a generates a plurality of Gray code images G3 different from one another in step St3. The Gray code images G3 are an example of "first space code images". The processing apparatus 210a determines the number of Gray code images G3 in accordance with the horizontal and vertical resolution of the overlap region 3. The horizontal resolution of the overlap region 3 is the number of pixels of the image G1 corresponding to the overlap region 3, the pixels being those arranged in the axis-X direction. The vertical resolution of the overlap region 3 is the number of pixels of the image G1 corresponding to the overlap region 3, the pixels being those arranged in the axis-Z direction. The shape of the overlap region 3 changes in accordance with the state in which the projectors 10A and 10B are installed. The processing apparatus 210a generates a plurality of Gray code images G3 different from one another in accordance with the overlap region 3 identified in step St2. The processing apparatus 210a therefore does not need to generate the Gray code image G3 more than necessary.

Figure 8:
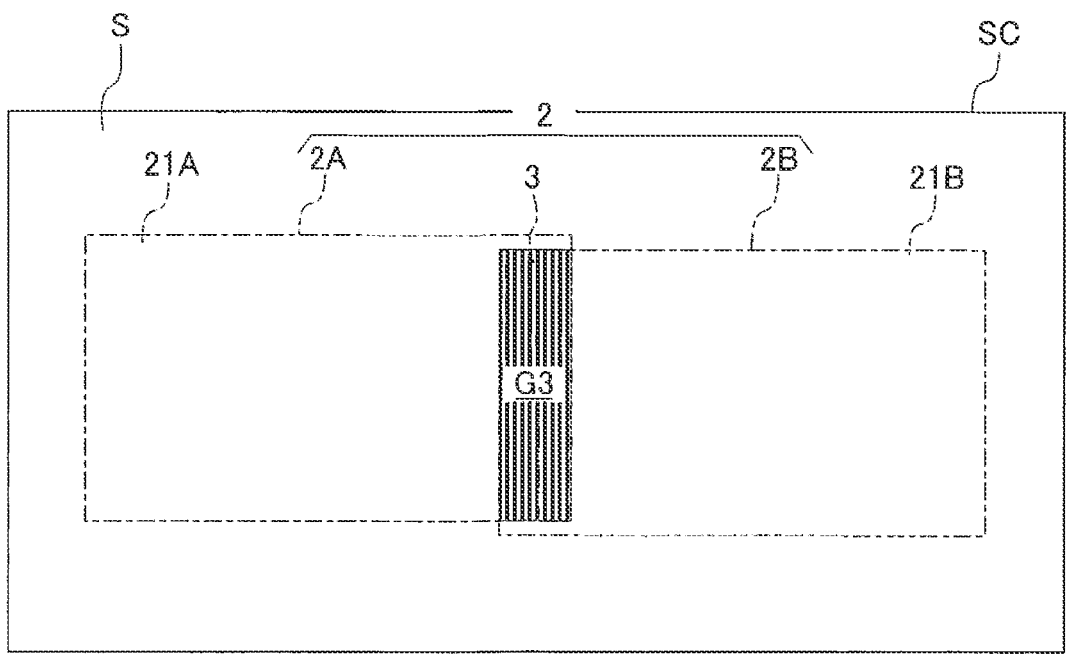
FIG. 8 diagrammatically shows the screen on which Gray code images are displayed.

The projection apparatus 260a then projects in step St4 the plurality of Gray code images G3 different from each other onto the display surface S in a time-division manner. FIG. 8 diagrammatically shows the screen SC on which the Gray code images G3 are displayed.

Under the control of the processing apparatus 210a, the imaging apparatus 250a produces captured images by capturing images of the overlap region 3 that displays the Gray code images G3. The captured images are an example of "third captured images". The imaging apparatus 250a captures an image of the overlap region 3 whenever the plurality of Gray code images G3 different from one another are each displayed in the overlap region 3.

The processing apparatus 210a identifies in step St5, based on a plurality of captured images corresponding in a one-to-one correspondence to the plurality of Gray code images G3 and produced by the imaging apparatus 250a through capture of images of the overlap region 3 where the plurality of Gray code images G3 are projected, third correspondence between a plurality of pixels corresponding to the overlap region 3 in the image G1 and a plurality of pixels corresponding to the overlap region 3 in the captured images captured by the imaging apparatus 250a. Specifically, the processing apparatus 210a identifies the third correspondence by analyzing a binary code, which will be described later, indicated by each of the pixels of the image from the projection apparatus 260a that correspond to the pixels of the overlap region 3. The processing apparatus 210a updates a portion of the first correspondence stored in the lookup table LUTa, the portion corresponding to the overlap region 3 of the image G1, to the third correspondence. The lookup table LUTa thus stores the first correspondence for the non-overlap region 21A and the third correspondence for the overlap region 3. The third correspondence is an example of a "second relationship".

Figure 9:
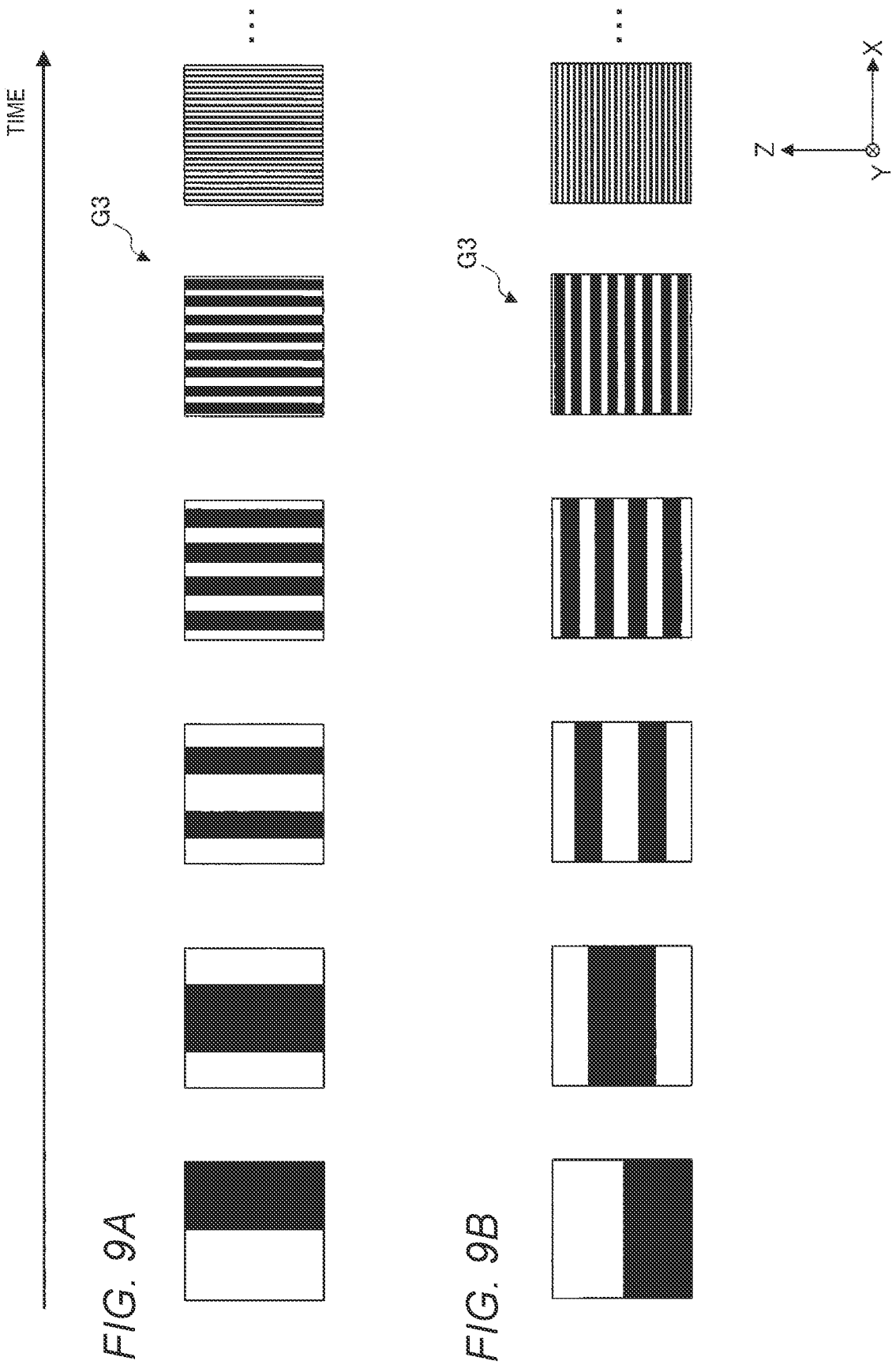
FIGS. 9A and 9B show examples of Gray code images displayed in an overlap region.

The relationship between the plurality of pixels that form the image G1 and a Gray code pattern will now be described. FIGS. 9A and 9B show examples of the Gray code images G3 displayed in the overlap region 3. FIG. 9A shows Gray code images G3 each formed of black and white stripes having a longitudinal direction extending along the axis-Z direction. FIG. 9B shows Gray code images G3 each formed of black and white stripes having a longitudinal direction extending along the axis-X direction. The Gray code images G3 are each a kind of image expressed by bright and dark portions and representing a binary code having black/white binary values or illuminated and non-illuminated states, and is skillfully configured to be robust against noise. In the present embodiment, the projection apparatus 260a displays the Gray code images G3 in FIGS. 9A and 9B sequentially from left to right in the figure in the overlap region 3. In this process, assigning different time-variant luminance patterns formed of black having a luminance of 0 and white having a luminance of 1 to all the pixels of an image from the projection apparatus 260a causes the pixels of the image from the projection apparatus 260a to correspond to binary codes different from one another. That is, the pixels of the image from the projection apparatus 260a are each caused to correspond to a binary code and emit light in a measurement pattern representing the unique binary code. Therefore, when the Gray code images G3 shown in FIG. 9A are formed N Gray code images G3, a unique binary code is given to each of $2^N$ pixels in the axis-X direction out of the pixels of the image from the projection apparatus 260a that correspond to the overlap region 3. Similarly, when the Gray code images G3 shown in FIG. 9B are formed M Gray code images G3, a unique binary code is given to each of $2^M$ pixels in the axis-Z direction out of the pixels of the image from the projection apparatus 260a that correspond to the overlap region 3. That is, using the N Gray code images G3 shown in FIG. 9A and the M Gray code images G3 shown in FIG. 9B allows a unique binary code to be given to each of the $2^N \times 2^M$ pixels of the image from the projection apparatus 260a that correspond to the overlap region 3. The imaging apparatus 250a therefore records the number of the illuminated one of the Gray code images G3 and the number of the non-illuminated one of the Gray code images G3 to allow identification of the correspondence between the measurement pattern observed at each of the pixels of the image from the imaging apparatus 250a and the binary code at a pixel of the image from the projection apparatus 260a. The number of necessary binary codes is therefore determined in accordance with the number of pairs of a pixel in the camera coordinate system and a pixel in the projector coordinate system, the pixels desired to acquire the correspondence, in the axis-X and axis-Z directions. For example, the smaller the horizontal resolution of the overlap region 3, the smaller the number of necessary binary codes.

The process in step St3 to the process in step St5 described above correspond to the second calibration, which is performed in the overlap region 3 and causes the camera coordinate system to correspond to the projector coordinate system. In the first calibration, the calibration is performed by using a single first calibration image CG1. In the first calibration image CG1, a plurality of first markers CP1, which serve as a positioning reference, are arranged. The first calibration can identify the correspondence between the pixel of the image G1 at which a first marker CP1 is located and a pixel among the plurality of pixels that form the captured image. The correspondence between the pixels located between first markers CP1 adjacent to each other and pixels of the captured image is, however, identified by the interpolation. On the other hand, in the second calibration, since the third correspondence is identified by using a plurality of Gray code images G3, the accuracy of the correspondence in the overlap region 3 is higher than the accuracy of the correspondence in the non-overlap region 21A. Therefore, according to the present embodiment, the accuracy of the calibration in the overlap region 3 can be increased as compared with the accuracy of the calibration in the non-overlap region 21A.

The processing apparatus 210a subsequently transmits in step St6 completion notification indicating that the second calibration has been completed to the projector 10B via the communication apparatus 230a. Upon receipt of the completion notification, the projector 10B starts the second calibration, as the projector 10A does. Specifically, the processing apparatus 210b carries out the process in step St3 to the process in step St5.

The processing apparatus 210b generates a plurality of Gray code images G3 different from one another in step St3. The Gray code images G3 are an example of "second space code images".

The projection apparatus 260b projects in step St4 each of the plurality of Gray code images G3 different from each other onto the display surface S in a time division manner. Under the control of the processing apparatus 210b, the imaging apparatus 250b then produces captured images by capturing images of the overlap region 3 that displays the Gray code images G3. The captured images are an example of "fourth captured images". The imaging apparatus 250b captures an image of the overlap region 3 whenever the plurality of Gray code images G3 different from one another are each displayed in the overlap region 3.

The processing apparatus 210b identifies in step St5, based on a plurality of captured images corresponding in a one-to-one correspondence to the plurality of Gray code images G3 and produced by the imaging apparatus 250b through capture of images of the overlap region 3 where the plurality of Gray code images G3 are projected, fourth correspondence between a plurality of pixels corresponding to the overlap region 3 in the image G2 and a plurality of pixels corresponding to the overlap region 3 in the captured images captured by the imaging apparatus 250b. Specifically, the processing apparatus 210b identifies the fourth correspondence by analyzing the binary code indicated by each of the pixels of the image from the projection apparatus 260b that correspond to the pixels of the overlap region 3. The processing apparatus 210b updates a portion of the second correspondence stored in the lookup table LUTb, the portion corresponding to the overlap region 3 of the image G2, to the fourth correspondence. The lookup table LUTb thus stores the second correspondence for the non-overlap region 21B and the fourth correspondence for the overlap region 3. The processing apparatus 210b then transmits completion notification indicating that the second calibration has been completed to the projector 10A via the communication apparatus 230b.

In step St7, the processing apparatus 210a evaluates whether or not the completion notification has been received from the projector 10B, and repeats the evaluation until the result of the evaluation becomes affirmative. When the completion notification is received from the projector 10B, the result of the evaluation becomes affirmative, and the processing apparatus 210a projects the image G1 onto the display surface S in step St8. In step St8, the processing apparatus 210a outputs the input image data D1 to the image processing circuit 270a. The image processing circuit 270a refers to the lookup table LUTa to perform the keystone correction on the input image data D1. The image processing circuit 270a outputs the corrected image data Dh produced by the keystone correction to the optical modulator 262a, so that the image G1 based on the corrected image data Dh is displayed on the screen SC. The lookup table LUTa stores the first correspondence for the non-overlap region 21A and the third correspondence for the overlap region 3. Therefore, according to the present embodiment, the accuracy of the keystone correction in the overlap region 3 can be higher than the accuracy of the keystone correction in the non-overlap region 21A.

After the second calibration is completed, the projector 10B projects the image G2 onto the display surface S as in step St8. Specifically, the processing apparatus 210*b* outputs the input image data D2 to the image processing circuit 270*b*. The image processing circuit 270*b* refers to the lookup table LUTb to perform the keystone correction on the input image data D2. The image processing circuit 270*b* outputs the corrected image data Dh produced by the keystone correction to the optical modulator 262*b*, so that the image G2 based on the corrected image data Dh is displayed on the screen SC.

As understood from the above description, the projection system 100 provided with the projector 10A including the imaging apparatus 250*a* and the projector 10B including the imaging apparatus 250*b* executes a control method for displaying the image G1 projected from the projector 10A and the image G2 projected from the projector 10B with the images G1 and G2 overlapping with each other in the overlap region 3 of the display surface S. Specifically, the projection system 100 executes a control method including steps St1, St5, and St8 described above. The projection system 100 identifies in step St1 the first correspondence between the plurality of pixels that form the image G1 projected from the projector 10A onto the first projection region 2A of the display surface S and the plurality of pixels that form the first captured image produced by the imaging apparatus 250*a* through capture of an image of the display surface S, as described above. The projection system 100 further identifies in step St1 the second correspondence between the plurality of pixels that form the image G2 projected from the projector 10B onto the second projection region 2B of the display surface S and the plurality of pixels that form a second captured image produced by the imaging apparatus 250*b* through capture of an image of the display surface S. The projection system 100 identifies in step St5 the third correspondence between the plurality of pixels corresponding to the overlap region 3 in the image G1 projected by the projector 10A and the plurality of pixels corresponding to the overlap region 3 in the first captured image. The projection system 100 further identifies in step St5 the fourth correspondence between the plurality of pixels corresponding to the overlap region 3 in the image G2 projected by the projector 10B and the plurality of pixels corresponding to the overlap region 3 in the second captured image. The projection system 100 projects in step St8, based on the first correspondence, the image G1 onto the non-overlap region 21A, which is a region different from the overlap region 3 out of the first projection region 2A, and the image G1 onto the overlap region 3 based on the third correspondence, which is more accurate than the first correspondence. The projection system 100 further projects in step St8, based on the second correspondence, the image G2 onto the non-overlap region 21B, which is a region different from the overlap region 3 out of the second projection region 2B, and the image G2 onto the overlap region 3 based on the fourth correspondence, which is more accurate than the second correspondence.

The present disclosure, in which the accuracy of calibration in the overlap region 3 can be higher than the accuracy of calibration in the other regions or the non-overlap regions 21A and 21B as described above, allows improvement in the quality of the image in the overlap region 3, where the image G1 projected from the projector 10A and the image G2 projected from the projector 10B overlap with each other, compared to a case where inaccurate calibration is performed across the region. Furthermore, since the highly accurate calibration only needs to be performed in the overlap region 3, the time required for the calibration is shorter than in a case where the highly accurate calibration is performed across the region. Therefore, according to the present disclosure, the time necessary for the calibration can be shortened with the accuracy of the calibration in the overlap region 3 improved.

The projector 10A identifies the third correspondence based on a plurality of captured images produced by projecting a plurality of Gray code images G3 different from each other onto the overlap region 3 in a time-division manner and causing the imaging apparatus 250*a* to capture images of the overlap region 3 on which the plurality of Gray code images G3 are projected and corresponding in one-to-one correspondence to the plurality of Gray code images G3, and the projector 10B identifies the fourth correspondence based on a plurality of captured images produced by projecting a plurality of Gray code images G3 different from each other onto the overlap region 3 in a time-division manner and causing the imaging apparatus 250*b* to capture images of the overlap region 3 on which the plurality of Gray code images G3 are projected and corresponding in one-to-one correspondence to the plurality of Gray code images G3.

According to the present disclosure, since the Gray code images G3 are projected only onto the overlap region 3, the number of Gray code images G3 necessary for the identification of the third and fourth correspondence only needs to be the number according to the resolution of the overlap region 3. Excessive time will therefore not be spent to identify the third and fourth correspondence.

The number of plurality of Gray code images G3 to be generated by the projector 10A changes in accordance with the number of a plurality of pixels corresponding to the overlap region 3 in an image projected by the projector 10A, and the number of plurality of Gray code images G3 to be generated by the projector 10B changes in accordance with the number of a plurality of pixels corresponding to the overlap region 3 in an image projected by the projector 10B. The projectors 10A and 10B therefore do not need to generate the Gray code images G3 more than necessary.

The first correspondence is identified based on the first calibration image CG1 projected from the projector 10A onto the first projection region 2A and a captured image produced by the imaging apparatus 250*a* through capture of an image of the display surface S on which the first calibration image CG1 is projected. The second correspondence is identified based on the second calibration image CG2 projected from the projector 10B onto the second projection region 2B and a captured image produced by the imaging apparatus 250*b* through capture of an image of the display surface S on which the second calibration image CG2 is projected. The first calibration image CG1 contains the plurality of regularly arranged first markers CP1. The second calibration image CG2 contains the plurality of regularly arranged second markers CP2.

The projector 10A identifies as the overlap region 3 the region containing pixels having luminance greater than a threshold out of a plurality of pixels that form a captured image produced by the imaging apparatus 250*a* through capture of an image of the first projection region 2A on which a monochromatic image is projected, the projector 10B identifies as the overlap region 3 the region containing pixels having luminance greater than a threshold out of a plurality of pixels that form a captured image produced by the imaging apparatus 250b through capture of an image of the second projection region 2B on which a monochromatic image is projected. The projectors 10A and 10B can selectively project the Gray code images G3 only onto the overlap region 3 of the display surface S by identifying the overlap region 3.

2. Variations

Figure 10:
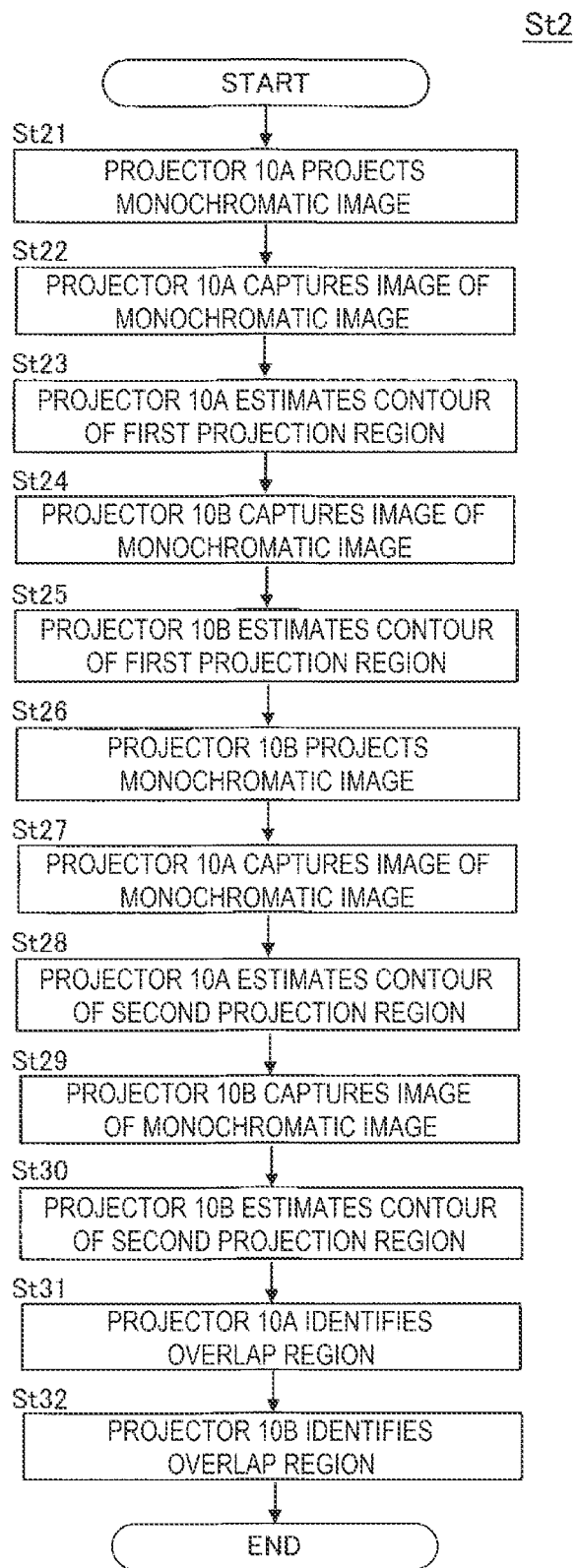
FIG. 10 is a flowchart showing one step according to a variation in detail in the action of the projector.

The aforementioned forms presented by way of example can be changed in a variety of manners. Aspects of specific variations applicable to each of the aforementioned forms are presented below byway of example. Two or more of the aspects arbitrarily selected from those presented below by way of example may be combined with each other as appropriate to the extent that the selected aspects do not contradict each other.
Variation 1
In the aspect described above, the projection system 100 is configured to include the two projectors 10, but not necessarily, and may be configured to include two or more projectors 10.
Variation 2
In the aspect described above, the Gray code images G3 are projected onto the overlap region 3, but not necessarily, and space code images different from the Gray code images G3 may be projected. Examples of the space code images may include phase shift images.
Variation 3
The method for identifying the overlap region 3 is not limited to the method presented by way of example in the aspect described above. The projector 10 may identify the overlap region 3, for example, by using a method shown in FIG. 10. FIG. 10 is a flowchart showing step St2 according to Variation 3 in detail. Step St2 will be described below with reference to FIG. 10 as appropriate.

First, in step St21, the processing apparatus 210a reads the monochromatic image data Dxa stored in advance in the storage apparatus 220a and outputs the data to the projection apparatus 260a. The projection apparatus 260a projects the monochromatic image onto the display surface S in accordance with the data. The contour of the monochromatic image coincides with the contour of the first projection region 2A. Thereafter, in step St22, the imaging apparatus 250a captures an image of the display surface S that displays the monochromatic image projected from the projection apparatus 260a under the control of the processing apparatus 210a. Subsequently, in step St23, the processing apparatus 210a identifies the contour of the first projection region 2A from the captured image that is the captured monochromatic image. Specifically, in step St23, the processing apparatus 210a identifies the pixels corresponding to the contour of the monochromatic image in the camera coordinate system out of the pixels of the captured image that is the captured display surface S that displays the monochromatic image projected from the projection apparatus 260a. The processing apparatus 210a then refers to the lookup table LUTa, which stores the first correspondence, to identify the pixels corresponding to the contour of the monochromatic image in the projector coordinate system of the projector 10A.

Thereafter, in step St24, the imaging apparatus 250b captures an image of the display surface S that displays the monochromatic image projected from the projection apparatus 260a, as the imaging apparatus 250a does. Subsequently, in step St25, the processing apparatus 210b identifies the contour of the first projection region 2A from the captured image that is the captured monochromatic image. Specifically, in step St25, the processing apparatus 210b identifies the pixels corresponding to the contour of the monochromatic image in the camera coordinate system out of the pixels of the captured image that is the captured display surface S that displays the monochromatic image projected from the projection apparatus 260a. The processing apparatus 210b then refers to the lookup table LUTb, which stores the second correspondence, to identify the pixels corresponding to the contour of the monochromatic image in the projector coordinate system of the projector 10B. The processing apparatus 210a then causes the projection apparatus 260a to stop projecting the monochromatic image.

Subsequently, in step St26, the processing apparatus 210b reads the monochromatic image data Dxb stored in advance in the storage apparatus 220b and outputs the data to the projection apparatus 260b. The projection apparatus 260b projects the monochromatic image onto the display surface S in accordance with the data. The contour of the monochromatic image coincides with the contour of the second projection region 2B. Thereafter, in step St27, the imaging apparatus 250a captures an image of the display surface S that displays the monochromatic image projected from the projection apparatus 260b under the control of the processing apparatus 210a. Subsequently, in step St28, the processing apparatus 210a identifies the contour of the second projection region 2B from the captured image, which is the captured monochromatic image, as in the preceding step St23.

Thereafter, in step St29, the imaging apparatus 250b captures an image of the display surface S that displays the monochromatic image projected from the projection apparatus 260b, as the imaging apparatus 250a does. Subsequently, in step St30, the processing apparatus 210b identifies the contour of the second projection region 2B from the captured image that is the captured monochromatic image, as in the preceding step St25.

Subsequently, in step St31, the processing apparatus 210a identifies as the overlap region 3 in the projector coordinate system the region surrounded by the contour of the first projection region 2A identified in the preceding step St23 and the contour of the second projection region 2B identified in the preceding step St28. Thereafter, in step St32, the processing apparatus 210b identifies as the overlap region 3 in the projector coordinate system the region surrounded by the contour of the first projection region 2A identified in the preceding step St25 and the contour of the second projection region 2B identified in the preceding step St30, as the processing apparatus 210a does.

As is understood from the above description, the projection system 100 according to Variation 3 executes the control method described above. The control method to be executed includes steps St23, St25, St28, St30, St31, and St32 described above. As described above, in step St23, the projector 10A identifies the contour of the first projection region 2A based on the captured image produced by the imaging apparatus 250a through capture of an image of the display surface S on which the monochromatic image is projected. In step St25, the projector 10B identifies the contour of the first projection region 2A based on the captured image produced by the imaging apparatus 250b through capture of an image of the display surface S on which the monochromatic image is projected. In step St28, the projector 10A identifies the contour of the second projection region 2B based on the captured image produced by the imaging apparatus 250a through capture of an image of the display surface S on which the monochromatic image is projected. In step St30, the projector 10B identifies the contour of the second projection region 2B based on the captured image produced by the imaging apparatus 250b through capture of an image of the display surface S on which the monochromatic image is projected. In steps St31 and St32, the projectors 10A and 10B identify as the overlap region 3 the region surrounded by the identified contour of the first projection region 2A and the identified contour of the second projection region 2B, respectively. When the projection system 100 according to Variation 3 executes the control method described above, the overlap region 3 is identified by the projectors 10A and 10B. The projectors 10A and 10B can therefore selectively project the Gray code images G3 only onto the overlap region 3 of the display surface S.

Variation 4

Figure 11:
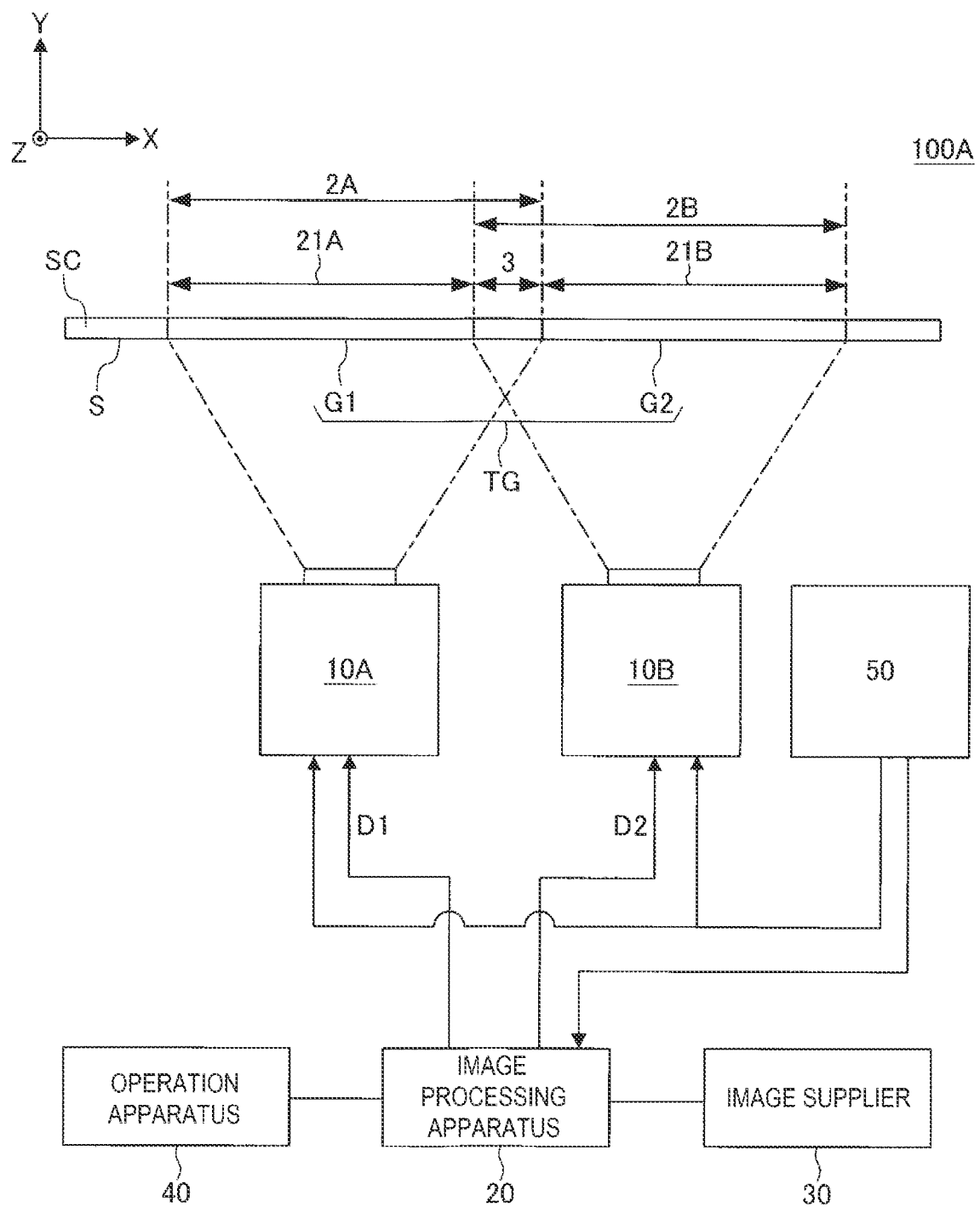
FIG. 11 shows an example of the configuration of a projection system according to a variation.

FIG. 11 shows an example of the configuration of a projection system 100A according to Variation 4. In the aspect described above, the projectors 10 are each configured to include the imaging apparatus 250, but not necessarily, and the projection system 100A may be configured to include an imaging apparatus 50 separate from the projectors 10. The imaging apparatus 50 is communicably coupled to each of the projectors 10 or the image processing apparatus 20, has the same configuration as that of the imaging apparatus 250 in the aspect described above, and operates in the same manner in accordance with which the imaging apparatus 250 operates. The projectors 10 according to the Variation 4 each have the same configuration as that of the projectors 10 in the aspect described above except that the imaging apparatus 250 is removed from each of the projectors 10 in the aspect described above. The projection system 100A according to the Variation 4 operates in the same manner in accordance with which the projection system 100 in the aspect described above operates.

As is understood from the above description, the projection system 100A provided with the projector 10A, the projector 10B, and the imaging apparatus 50 executes a control method for displaying the image G1 projected from the projector 10A and the image G2 projected from the projector 10B with the images G1 and G2 overlapping with each other in the overlap region 3 of the display surface S. Specifically, the projection system 100A executes a control method including steps St1, St5, and St7 described above. In step St1, the projection system 100A identifies the first correspondence between the plurality of pixels that form the image G1 projected from the projector 10A onto the first projection region 2A of the display surface S and the plurality of pixels that form the captured image produced by the imaging apparatus 50 through capture of an image of the display surface S on which the image G1 is projected, as described above. In step St1, the projection system 100A further identifies the second correspondence between the plurality of pixels that form the image G2 projected from the projector 10B onto the second projection region 2B of the display surface S and the plurality of pixels that form the captured image produced by the imaging apparatus 50 through capture of an image of the display surface S on which the image G2 is projected. In step St5, the projection system 100A identifies the third correspondence between the plurality of pixels corresponding to the overlap region 3 in the image G1 projected by the projector 10A and the plurality of pixels corresponding to the overlap region 3 in the image captured by the imaging apparatus 50. In step St5, the projection system 100A further identifies the fourth correspondence between the plurality of pixels corresponding to the overlap region 3 in the image G2 projected by the projector 10B and the plurality of pixels corresponding to the overlap region 3 in the image captured by the imaging apparatus 50. In step St7, the projection system 100A projects, based on the first correspondence, the image G1 onto the non-overlap region 21A, which is the region different from the overlap region 3, of the first projection region 2A, and the image G1 onto the overlap region 3 based on the third correspondence, which is more accurate than the first correspondence. In step St7, the projection system 100A further projects, based on the second correspondence, the image G2 onto the non-overlap region 21B, which is the region different from the overlap region 3, of the second projection region 2B, and the image G2 onto the overlap region 3 based on the fourth correspondence, which is more accurate than the second correspondence. The control method provides the same effects and advantages as those provided by the method for controlling the projection system 100 according to the aspect described above.

Variation 5

In the aspects described above, the processing apparatus 210 identifies the overlap region 3 from a captured image that is a captured display surface S that displays a monochromatic image, but not necessarily. The processing apparatus 210 may identify the overlap region 3 based, for example, on data inputted from the operator via the operating apparatus 40 and representing the widths of the overlap region 3 in the axis-X and the axis-Z directions.

Variation 6

In the aspects described above, the projection apparatus 260 may project the Gray code images G3 different from one another in a time division manner onto an enlarged overlap region encompassing the overlap region 3 identified in step St2 in the aspects described above. The Gray code images G3 can therefore be displayed in the overlap region 3 even when the accuracy of the identification of the overlap region 3 is low in step St2 in the aspects described above. The enlarged overlap region is formed of a plurality of pixels corresponding to the overlap region 3 identified in step St2 in the aspects described above out of the pixels that form the liquid crystal panels of the optical modulator 262, and a plurality of pixels present around the plurality of pixels.

Variation 7

In the above aspects described above, the lookup table LUT is used to perform the keystone correction, but not necessarily in the present disclosure. For example, the keystone correction may be performed by using a projection transformation matrix that causes a plurality of pixels that form the image G projected from each of the projectors 10 to correspond to a plurality of pixels that forma captured image.

Variation 8

In the aspects described above, the first calibration and the second calibration are performed by the processing apparatus 210 provided in the projector 10, but not necessarily in the present disclosure. For example, the first calibration and the second calibration may be performed under the control of the image processing apparatus 20 coupled to the projector 10 so as to be communicable with respect to each other. In this case, the first calibration image CG1 and the Gray code images G3 may be generated by the image processing apparatus 20 and transmitted to the projector 10A. Similarly, the second calibration image CG2 and the Gray code images G3 may be generated by the image processing apparatus 20 and transmitted to the projector 10B. Furthermore, an image captured by the imaging apparatus 50 or 250 may be received to identify the correspondence between the imaging apparatus used to receive the captured image and the projector 10. Moreover, data representing the identified correspondence may be transmitted to the projectors 10, or an image for projection generated based on the identified correspondence may be transmitted to the projectors 10.

What is claimed is:

1. A projection system controlling method comprising:
   identifying a first correspondence between a plurality of pixels of an image projected from a first projector onto a first projection region of a display surface and a plurality of pixels of a first captured image obtained by capturing the display surface with a first camera provided in the first projector;
   identifying a second correspondence between a plurality of pixels of an image projected from a second projector onto a second projection region of the display surface and a plurality of pixels of a second captured image obtained by capturing the display surface with a second camera provided in the second projector;
   identifying a third correspondence having an accuracy higher than an accuracy of the first correspondence between a plurality of pixels corresponding to an overlap region in the image projected by the first projector, the overlap region overlapping with the image projected from the second projector on the display surface, and a plurality of pixels corresponding to the overlap region in the first captured image;
   identifying a fourth correspondence having an accuracy higher than an accuracy of the second correspondence between a plurality of pixels corresponding to the overlap region in the image projected by the second projector and a plurality of pixels corresponding to the overlap region in the second captured image;
   projecting, by the first projector, an image onto a region of the first projection region different from the overlap region based on the first correspondence;
   projecting, by the first projector, an image onto the overlap region based on the third correspondence;
   projecting, by the second projector, an image onto a region of the second projection region different from the overlap region based on the second correspondence; and
   projecting, by the second projector, an image onto the overlap region based on the fourth correspondence, wherein
   the first projector projects a plurality of first space code images different from one another onto the overlap region in time division,
   the third correspondence is identified based on each of a plurality of third captured images obtained by capturing the overlap region on which the plurality of first space code images are projected with the first camera and corresponding in a one-to-one correspondence to the plurality of first space code images,
   the second projector projects a plurality of second space code images different from one another onto the overlap region in time division,
   the fourth correspondence is identified based on each of a plurality of fourth captured images obtained by capturing the overlap region on which the plurality of second space code images are projected with the second camera and corresponding in a one-to-one correspondence to the plurality of second space code images,
   a number of the plurality of first space code images varies in accordance with a number of a plurality of pixels corresponding to the overlap region in the image projected by the first projector, and
   a number of the plurality of second space code images varies in accordance with a number of a plurality of pixels corresponding to the overlap region in the image projected by the second projector.

2. The projection system controlling method according to claim 1,
   wherein the first space code images and the second space code images are each a Gray code image.

3. The projection system controlling method according to claim 1,
   wherein the first correspondence is identified based on a first calibration image projected from the first projector onto the first projection region and the first captured image obtained by capturing the display surface on which the first calibration image is projected with the first camera,
   the second correspondence is identified based on a second calibration image projected from the second projector onto the second projection region and the second captured image obtained by capturing the display surface on which the second calibration image is projected with the second camera,
   the first calibration image contains a plurality of regularly arranged first markers, and
   the second calibration image contains a plurality of regularly arranged second markers.

4. The projection system controlling method according to claim 1,
   wherein the overlap region is identified based on a captured image obtained by capturing the display surface on which a first projection image is projected from the first projector and a second projection image is projected from the second projector.

5. The projection system controlling method according to claim 4,
   wherein the first projector identifies as the overlap region a region containing pixels having luminance greater than or equal to a threshold out of a plurality of pixels of a captured image obtained by capturing the first projection region on which the first projection image is projected with the first camera, and
   the second projector identifies as the overlap region a region containing pixels having luminance greater than or equal to the threshold out of a plurality of pixels of a captured image obtained by capturing the second projection region on which the second projection image is projected with the second camera.

6. The projection system controlling method according to claim 4,
   wherein the first projector
      identifies a contour of the first projection region based on a captured image obtained by capturing the display surface on which the first projection image is projected with the first camera, and
      identifies a contour of the second projection region based on a captured image obtained by capturing the display surface on which the second projection image is projected with the first camera,
   the second projector
      identifies the contour of the first projection region based on a captured image obtained by capturing the display surface on which the first projection image is projected with the second camera, and identifies the contour of the second projection region based on a captured image obtained by capturing the display surface on which the second projection image is projected with the second camera, and the first projector and the second projector identify a region surrounded by the contour of the first projection region and the contour of the second projection region as the overlap region respectively.

7. The projection system controlling method according to claim 4, wherein the first projection image and the second projection image are each a monochromatic image.

8. The projection system controlling method according to claim 1, wherein the first projector projects the plurality of first space code images different from one another in time division onto an enlarged overlap region that encompasses the overlap region of the display surface, and the second projector projects the plurality of second space code images different from one another onto the enlarged overlap region in time division.

9. A projection system controlling method comprising:

identifying a first correspondence between a plurality of pixels of an image projected from a first projector onto a first projection region of a display surface and a plurality of pixels of a first captured image obtained by capturing the display surface on which the image is projected from the first projector with a camera;

identifying a second correspondence between a plurality of pixels of an image projected from a second projector onto a second projection region of the display surface and a plurality of pixels of a second captured image obtained by capturing the display surface on which the image is projected from the second projector with the camera;

identifying a third correspondence having an accuracy higher than an accuracy of the first correspondence between a plurality of pixels corresponding to an overlap region of the image projected by the first projector, the overlap region overlapping with the image projected from the second projector on the display surface, and a plurality of pixels corresponding to the overlap region in the first captured image captured by the camera;

identifying a fourth correspondence having an accuracy higher than an accuracy of the second correspondence between a plurality of pixels corresponding to the overlap region of the image projected by the second projector and a plurality of pixels corresponding to the overlap region in the second captured image captured by the camera;

projecting, by the first projector, an image onto a region of the first projection region different from the overlap region based on the first correspondence;

projecting, by the first projector, an image onto the overlap region based on the third correspondence;

projecting, by the second projector, an image onto a region of the second projection region different from the overlap region based on the second correspondence; and projecting, by the second projector, an image onto the overlap region based on the fourth correspondence, wherein the first projector projects a plurality of first space code images different from one another onto the overlap region in time division, the third correspondence is identified based on each of a plurality of third captured images obtained by capturing the overlap region on which the plurality of first space code images are projected with the camera and corresponding in a one-to-one correspondence to the plurality of first space code images, the second projector projects a plurality of second space code images different from one another onto the overlap region in time division, the fourth correspondence is identified based on each of a plurality of fourth captured images obtained by capturing the overlap region on which the plurality of second space code images are projected with the camera and corresponding in a one-to-one correspondence to the plurality of second space code images, a number of the plurality of first space code images varies in accordance with a number of a plurality of pixels corresponding to the overlap region in the image projected by the first projector, and a number of the plurality of second space code images varies in accordance with a number of a plurality of pixels corresponding to the overlap region in the image projected by the second projector.

10. A projector comprising:

a camera;

a projection optical system; and one or more processors programmed to:

identify a first relationship that is a correspondence between a plurality of pixels of an image projected via the projection optical system onto a projection region of a display surface and a plurality of pixels of a captured image obtained by capturing the display surface with the camera, identify a second relationship having an accuracy higher than an accuracy of the first relationship that is a correspondence between a plurality of pixels corresponding to an overlap region of the image projected via the projection optical system, the overlap region being a region where the image projected via the projection optical system and an image projected from another projector different from the projector including the projection optical system on the display surface overlap with each other, and a plurality of pixels corresponding to the overlap region in the captured image, project, via the projection optical system, an image onto a region of the projection region different from the overlap region, based on the first relationship and project an image onto the overlap region based on the second relationship, wherein the projection optical system projects a plurality of first space code images different from one another onto the overlap region in time division, the second correspondence is identified based on each of a plurality of second captured images obtained by capturing the overlap region on which the plurality of first space code images are projected with the camera and corresponding in a one-to-one correspondence to the plurality of first space code images, a number of the plurality of first space code images varies in accordance with a number of a plurality of pixels corresponding to the overlap region in the image projected by the projection optical system, and a number of the plurality of second space code images varies in accordance with a number of a plurality of pixels corresponding to the overlap region in the image projected by the other projector.

\* \* \* \* \*